(12) United States Patent
Provitola

(10) Patent No.: US 6,691,504 B1
(45) Date of Patent: Feb. 17, 2004

(54) GASEOUS-FUEL BREATHING ROCKET ENGINE

(76) Inventor: Anthony Italo Provitola, P.O. Box 2855, DeLand, FL (US) 32721-2855

( * ) Notice: Subject to any disclaimer, the term of this patent is extended or adjusted under 35 U.S.C. 154(b) by 285 days.

(21) Appl. No.: 09/703,302

(22) Filed: Nov. 1, 2000

(51) Int. Cl.[7] .................................................. F02K 5/00
(52) U.S. Cl. ...................... 60/246; 60/39.465; 60/257; 60/258; 60/259
(58) Field of Search .................... 60/257, 258, 259, 60/246, 39.465

(56) References Cited

U.S. PATENT DOCUMENTS

| | | | |
|---|---|---|---|
| 4,224,790 A | 9/1980 | Christensen | |
| 5,012,640 A | * 5/1991 | Mirville | ................ 60/246 |
| 5,014,507 A | 5/1991 | Rice | |
| 5,063,734 A | 11/1991 | Morris | |
| 5,101,622 A | 4/1992 | Bond | |
| 5,778,658 A | 7/1998 | Lamando | |
| 6,148,609 A | 11/2000 | Provitola | |

* cited by examiner

*Primary Examiner*—Justine R. Yu
*Assistant Examiner*—William H. Rodriguez

(57) ABSTRACT

A gaseous-fuel rocket engine in which an expanding oxidizer driven turbine or electric motor drives the an axial gaseous-fuel turbine compressor. The oxidizer is subsequently injected into a gaseous-fuel duct surrounding the axial gaseous-fuel compressor and defining a gaseous-fuel path having an inlet. The gaseous-fuel and oxygen mixture is ignited and the burned gases are expanded through a converging-diverging exhaust nozzle.

14 Claims, 8 Drawing Sheets

GASEOUS-FUEL BREATHING ROCKET ENGINE

CROSS-REFERENCE TO RELATED APPLICATIONS

U.S. patent application Ser. No. 09/321,796 and International Application No. PCT/US00/09617.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The present invention is a gaseous-fuel breathing rocket engine power plant for accelerating vehicles such as aircraft and spacecraft by reaction thrusting. The principal use of the present invention is on aircraft and spacecraft having a large reservoir of gaseous fuel, which may be combustible by oxidation or in some other exothermic reaction.

The preferred gaseous fuel for the engine is a gaseous fuel that contains hydrogen gas. The reservoir containing such gaseous fuel may be the gas retaining structures of an airship, such as gas bags, wherein the gaseous fuel serves as the lifting gas.

The types of propulsion systems which create a propulsion force known as thrust to propel vehicles at high altitudes are the rocket motor and the jet engine. The propulsion force is the reaction force arising from increasing the backward momentum of a mass by the action of the propulsion system. In the case of the rocket motor, the rearward ejected mass comes from the propellant chemicals carried with the vehicle, and the backward momentum from the reaction between those propellant chemicals. In the case of the jet engine, addition of heat energy to a controlled flow of air passing through the jet engine increases the backward momentum of the airflow.

Some of the features of the present invention disclosed here relate to features of both jet engines and rocket motors. Unlike conventional jet engines which intake air, the present invention intakes gaseous fuel. If the gaseous fuel intaken does not have sufficient density for efficient combustion, it is compressed within the engine to achieve such combustion. Also, unlike conventional jet engines, the combustion of the gaseous fuel compressed by the turbine compressors takes place with a stored oxidizer which is injected into the gaseous fuel stream.

The use of gaseous hydrogen as fuel for power plants which compress air with turbine compressors is known from U.S. Pat. No. 5,012,640, The Combined Air-Hydrogen Turbo-Rocket Power Plant. The power plant disclosed in that patent, however, uses evaporating liquid hydrogen to drive a turbine which powers a turbine compressor to compress air into which gaseous hydrogen is injected for combustion, and does not use a turbine compressor to compress gaseous fuel or use liquid oxygen to drive the turbine. Also, that power plant does not use stored oxidizer to burn the hydrogen, but uses the air which has been compressed for such combustion. A power plant similar to the Combined Air-Hydrogen Turbo-Rocket Power Plant disclosed in U.S. Pat. No. 5,012,640 is disclosed in French Patent No. 2,215,538, but the principal difference between them appears to be the type and placement of the turbine which drives the air compressor. The drawings of U.S. Pat. No. 5,012,640 and French Patent No. 2,215,583 provide the needed current art with respect to driving turbine compressors with evaporating liquid gases, and are used for that purpose in this application.

A gaseous-fuel breathing turbo-rocket thruster has previously been disclosed by the present applicant in United States Patent Application No. 09/321,796, presently allowed and awaiting issue and publication, and International Application No. PCT/US00/09617, recently transmitted to the International Bureau. However, the thruster disclosed in Application No. 09/321,796 uses exhaust gases generated by the combustion of the intaken gaseous-fuel to drive a coaxial turbine which in turn drives the gaseous-fuel compressor. Such utilization of the energetic exhaust of said thruster may needlessly diminish the exit velocity of such exhaust.

The present invention has elements that are covered generally by Current United States Class 60, power plants, particularly subclass 246, and International Class: F02M 067/00; F02M 002/08; F01D 005/20.

BRIEF SUMMARY OF THE INVENTION

A combined gaseous-fuel and oxygen rocket engine is disclosed in which the oxygen driven turbine or electric motor drives the rotor wheel blades of the axial gaseous-fuel compressor stages. The rotor stages are located downstream of a stator vane structure and are driven by gaseous oxygen passing across the turbine blades. The oxygen is subsequently injected into an gaseous-fuel duct surrounding the axial gaseous-fuel compressor and defining an gaseous-fuel flow path having an gaseous-fuel inlet. The oxygen and gaseous-fuel mixture is ignited and the burned gases are expanded through a converging-diverging exhaust nozzle.

In the case of the gaseous-fuel compressor being powered by an oxygen driven turbine, the oxygen is supplied to the turbine from a liquid oxygen reservoir via at least one oxygen pump with the liquid passing through a heat exchanger to raise the temperature of the oxygen, thereby causing it to vaporize. The gaseous oxygen then passes to and drives a turbine, which in turn drives the axial gaseous-fuel compressor.

The oxygen pump may be driven electrically, or by an auxiliary turbine, again powered by gaseous oxygen, or may be mounted in the hub of the axial gaseous-fuel compressor and be driven directly by the compressor rotor wheel.

In the power plant according to the invention, each compressor rotor wheel may be driven electrically, or by at least one axial flow turbine rotor stage located outside the compressed gaseous-fuel duct in an annular chamber surrounding the duct, or by a turbine which is coaxially located with respect to the gaseous-fuel compressor and is connected to the compressor by a generally axially extending shaft.

In alternative embodiments of the invention, more than one turbine rotor blade may be associated with each of the axial compressor rotor blades and the axial compressor may comprise more than one rotor stage. If a plurality of compressor rotor stages are utilized, adjacent stages may rotate in the same direction, or they may rotate in opposite directions depending upon the orientation of the turbine rotor blades.

The multiple stages of the axial compressor may be located in a common annular chamber, or they may be located in separate annular chambers which may be connected to the oxygen supply system either in parallel or in series.

DETAILED DESCRIPTION OF THE INVENTION

The present invention is a compressed gaseous-fuel breathing rocket engine power plant for accelerating objects such as aircraft and spacecraft by reaction thrusting. The principal use of the present invention is on aircraft and spacecraft having a large reservoir of gaseous fuel, which may be combustible by oxidation or in some other exothermic reaction.

The preferred gaseous fuel for the turbo-rocket thruster is a gaseous fuel that contains hydrogen gas. The reservoir containing such gaseous fuel may be the gas retaining structures of an airship, such as gas bags, wherein the gaseous fuel serves as the lifting gas.

An oxygen driven turbine or electric motor drives the rotor wheel blades of the axial gaseous-fuel compressor stages. The rotor stages are located downstream of a stator vane structure and are driven by gaseous oxygen passing across the turbine blades. The oxygen is subsequently injected into a gaseous-fuel duct surrounding the axial gaseous-fuel compressor and defining a gaseous-fuel flow path having an gaseous-fuel inlet. The oxygen and gaseous-fuel mixture is ignited and the burned gases are expanded through a converging-diverging exhaust nozzle.

In the case of the gaseous-fuel compressor being powered by an oxygen driven turbine, the oxygen is supplied to the turbine from a liquid oxygen reservoir via at least one oxygen pump with the liquid passing through a heat exchanger to raise the temperature of the oxygen, thereby causing it to vaporize. The gaseous oxygen then passes to and drives a turbine, which in turn drives the axial gaseous-fuel compressor.

The oxygen pump may be driven electrically, or by an auxiliary turbine, again powered by gaseous oxygen, or may be mounted in the hub of the axial gaseous-fuel compressor and be driven directly by the compressor rotor wheel.

In the power plant according to the invention, each compressor rotor wheel may be driven electrically, or by at least one axial flow turbine rotor stage located outside the compressed gaseous-fuel duct in an annular chamber surrounding the duct, or by a turbine which is coaxially located with respect to the gaseous-fuel compressor and is connected to the compressor by a generally axially extending shaft.

Figure 1:
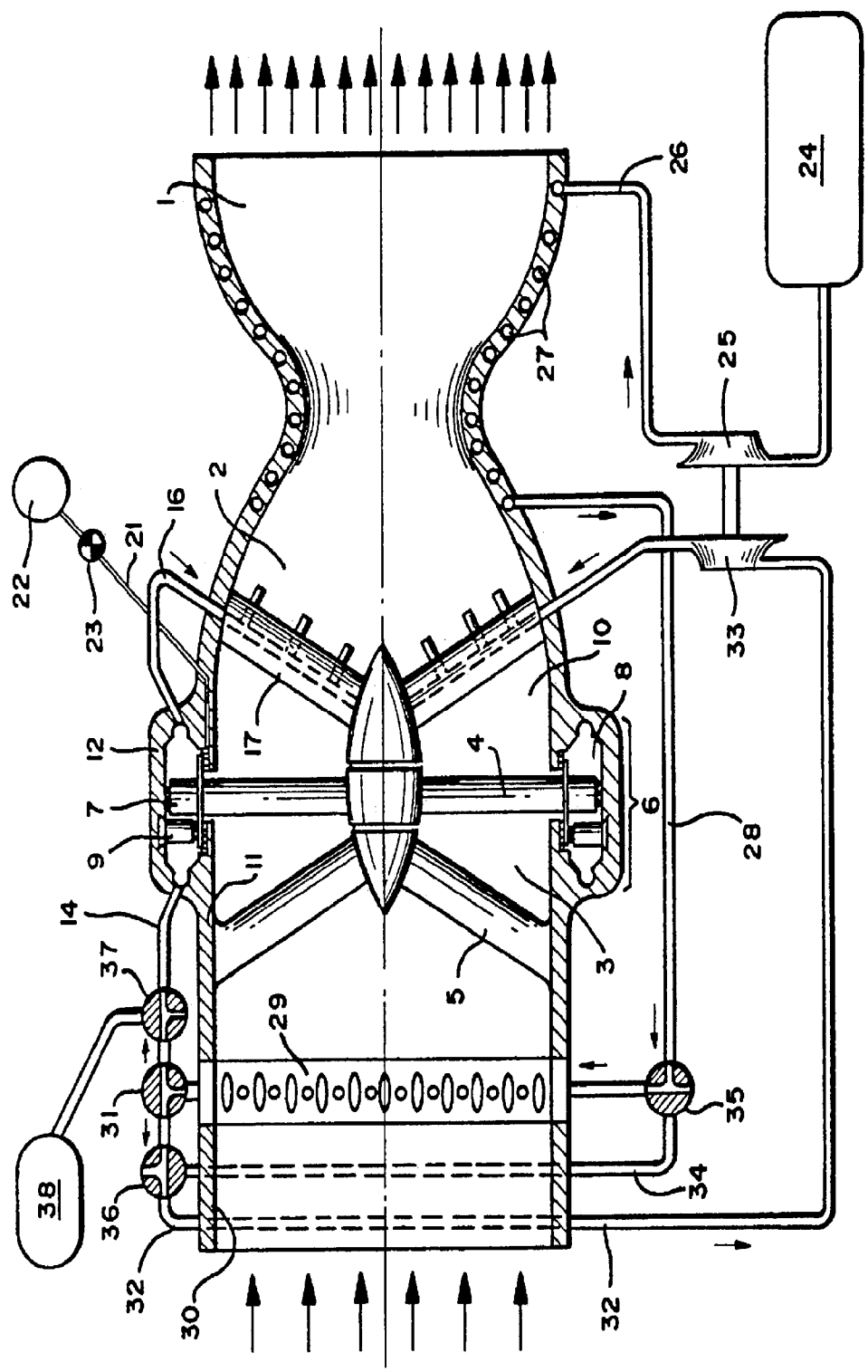
FIG. 1 is a longitudinal sectional view illustrating a first embodiment of the power plant according to the invention.
Figure 2:
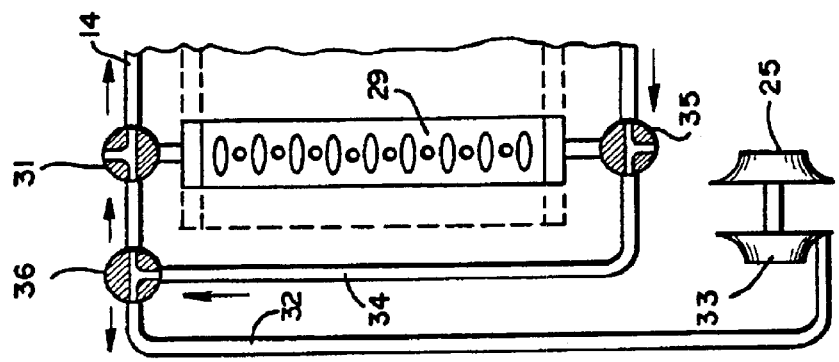
FIG. 2 is a partial, schematic diagram of the heat exchanger bypass circuit associated with the power plant illustrated in FIG. 1.
Figure 3:
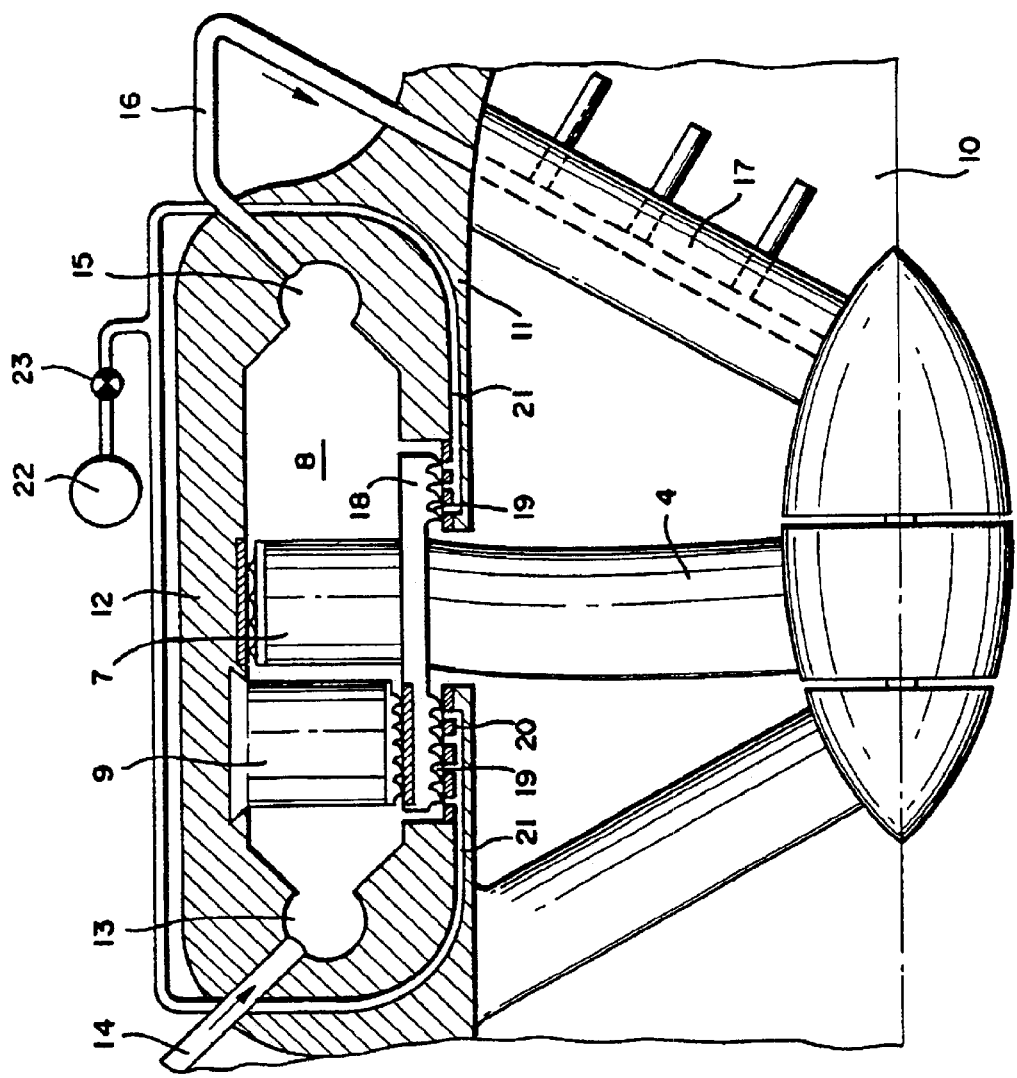
FIG. 3 is an enlarged, cross-sectional view illustrating the annular chamber of the device shown in FIG. 1.

A first embodiment of the power plant according to the invention, as illustrated in FIGS. 1–3, comprises a converging-diverging nozzle 1 connected to an gaseous-fuel duct casing 11 which defines a gaseous-fuel duct 10 and a combustion chamber 2, and surrounds an axial gaseous-fuel compressor 3. The gaseous-fuel compressor 3 comprises a rotor stage 4 consisting of a rotor wheel having a plurality of rotor blades extending radially therefrom in known fashion. The rotor stage 4 is located downstream of stator guide vane 5 which supports a hub coaxially with the longitudinal axis of the gaseous-fuel duct 10 to rotatably support the rotor stage 4. The gaseous-fuel duct 10 defines a gaseous-fuel intake 30 at its upstream end (the left end as viewed in FIG. 1) for the intake of gaseous-fuel to be compressed by the rotation of the rotor stage 4.

In the first embodiment the rotor stage 4 is driven by axial turbine assembly 6 which comprises at least one turbine rotor blade 7 formed as an extension of each of the compressor rotor blades. The turbine rotor blades 7 are located in an annular chamber 8 located outside the periphery of the gaseous-fuel duct 10 and formed by a portion of the turbine casing 12 and the gaseous-fuel duct casing 11. While the axial length of the annular chamber 8 may be greater than that of the rotor stage 4, the annular chamber 8 is located generally in the same plane as that of the rotor stage. The driving turbine also comprises a plurality of stator vanes 9 which may be attached to the turbine casing 12 so as to extend radially inwardly toward the gaseous-fuel duct casing 11. The axial turbine blades 7 may be formed integrally with, or may be formed as a separate element and attached to each of the blades of the compressor rotor stage 4.

In the first embodiment oxygen is supplied to the chamber 8 via supply tube 14 at point 13 upstream up the stator vane 9. After passing over the turbine stator vanes 9 and the turbine blades 7, the expanded oxygen is withdrawn from chamber 8 at area 15 via exhaust tube 16. Exhaust tube 16 directs the oxygen to injection tubes 17 to inject the oxygen into the combustion chamber 2 where it is ignited after mixing with the compressed gaseous-fuel.

In the first embodiment the compressor stage 4 must pass through the casing wall 11 defining gaseous-fuel duct 10, and therefore seal means must be provided to prevent the oxygen from chamber 8 from passing into the gaseous-fuel duct 10. A seal platform 18 extends between the compressor blades 4 and the turbine blades 7 and extends axially in both directions from the plane of the rotor stage 4. The sealing member 18 is located on the radially outer side of gaseous-fuel duct casing 11, but inside the turbine enclosure and defines labyrinth seals 19 which cooperate with abradable material 20 to provide the requisite seal.

In the first embodiment, additional sealing may be provided by directing inert gas through the cooperating surfaces of the labyrinth seals 19 and the abradable material 20. A source of pressurized inert gas 22, such as from an external reservoir holding pressurized helium, stores the inert gas at a pressure significantly higher than either that of the compressed gaseous-fuel or the oxygen. Conduit 21 connects the inert gas source 22 with the area adjacent the labyrinth seals 19 and the abradable material 20, and the flow of the inert gas is controlled by valve 23. By allowing a small flow of inert gas to leak through the juncture of the labyrinth seals 19 and the abradable material 20, leakage of the oxygen from chamber 8 into the gaseous-fuel duct 10 may be prevented.

In the first embodiment the circuit for supplying oxygen gas to the supply tube 14 may comprise a reservoir 24 storing liquid oxygen having an outlet connected to pump 25 which may pump the liquid oxygen from the reservoir 24 into supply tube 26. Tube 26 is connected to a heat exchanger 27, which may consist of a coil of conduit passing around or through the nozzle 1 so as to absorb the heat of the exhaust gases passing through the nozzle. The temperature of the oxygen passing through the heat exchanger 27 is raised and the oxygen is vaporized such that gaseous oxygen passes through conduit 28 connected to the outlet of the heat exchanger 27. The oxygen then may pass through a second heat exchanger 29 located adjacent to the intake duct 30 of the gaseous-fuel duct 10 to absorb heat from the incoming gaseous-fuel so as to further raise its temperature and potential energy, and to improve the compression of the cooled gaseous-fuel.

In the first embodiment, upon leaving the heat exchanger 29, the oxygen gas flow may be divided into two portions by a three-way, three-port valve 31. One portion of the oxygen gas flow is directed to the supply tube 14 and powers the axial turbine in the fashion previously discussed. The other portion of the oxygen gas flow is directed through tube 32 back to auxiliary turbine 33 which is mechanically connected to and drives the oxygen pump 25. After its expansion through the auxiliary turbine 33, the oxygen gas passes into the injection tubes 17 as illustrated in FIG. 1.

In the first embodiment, under certain operating conditions, specifically during low altitude ascent and low speed operation, the heat exchanger 29 may be bypassed by allowing the oxygen to flow through tube 34 and subsequently into supply tubes 14 and 32 as previously discussed. This may be easily achieved, as illustrated in FIG. 2, by valves 35 and 36 which are also three-way, three-port valves with valve 36 providing the same separation of oxygen flow as valve 31.

Figure 4:
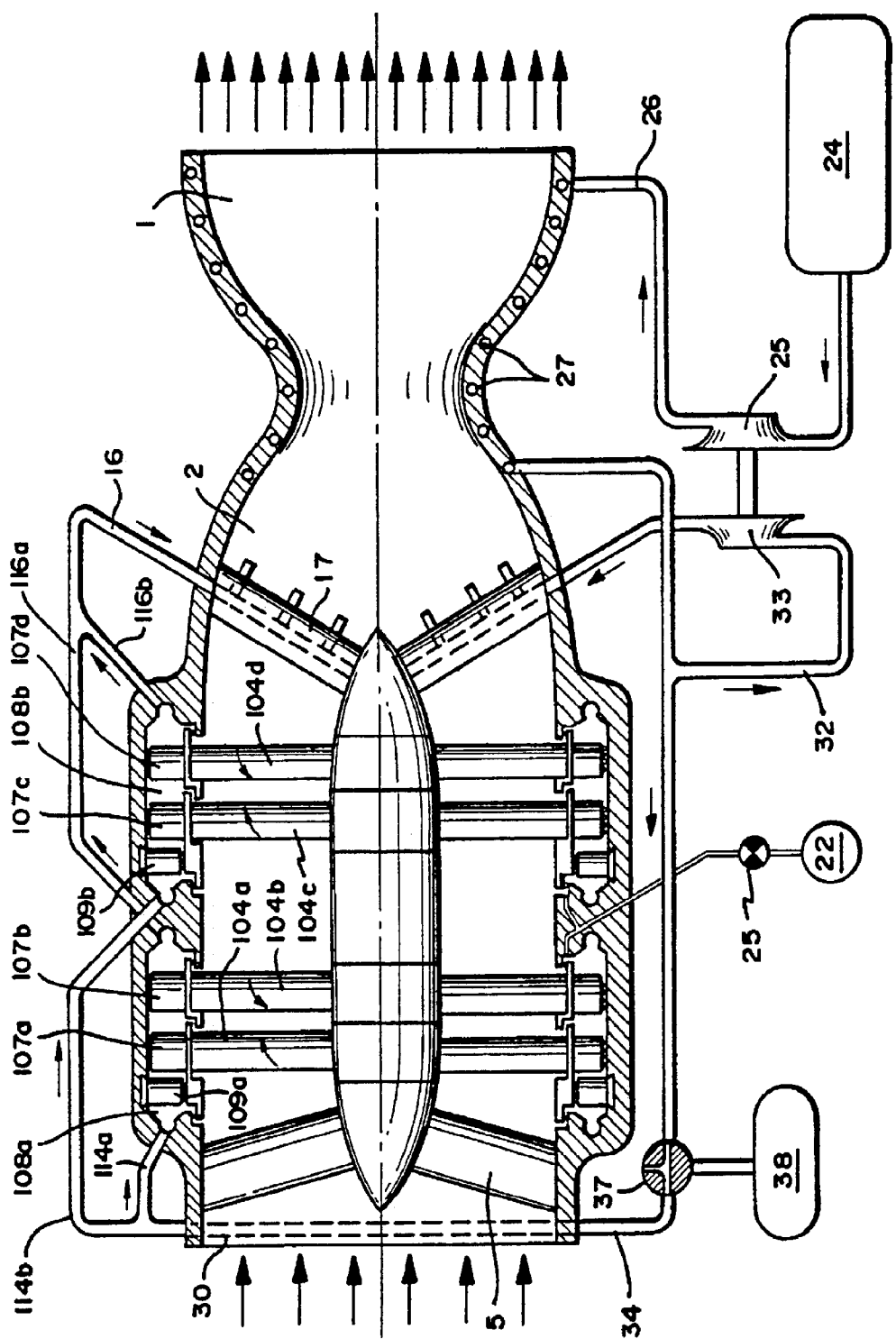
FIG. 4 is a longitudinal cross-sectional view of a first variation of the first embodiment of the power plant according to the invention.

A first variation on the first embodiment of the gaseous-fuel-oxygen turbo-rocket engine is illustrated in FIG. 4. In this variation of the first embodiment, an axial compressor having four rotor wheels or stages is utilized, with the rotor stages forming counter-rotating pairs 104a, 104b and 104c, 104d, respectively. In this figure, all of the components identical to those of the first embodiment (without variation) are the same whereas modified components are denoted by numerals increased by 100. In this variation of the first embodiment, the oxygen supply circuit is similar to that of the first embodiment (without variation) illustrated in FIG. 1, except that heat exchanger 29 adjacent to the gaseous-fuel intake 30 has been completely deleted. The counter-rotating pairs of axial turbine blades 107a, 107b and 107c, 107d, respectively, are located in separate annular chambers 108a and 108b. The annular chambers are connected to the oxygen supply tubes 114a and 114b in parallel. Stator vanes 109a and 109b direct the flow of oxygen over the axial turbine blades in the same manner as the first embodiment (without variation). The oxygen is withdrawn from the chambers 108a and 108b by exhaust tubes 116a and 116b, respectively.

In the first variation of the first embodiment, the absence of the heat exchanger in the gaseous-fuel intake duct 30, which results in a lesser potential energy of the oxygen than in the previous embodiment, is compensated for by the presence of two power turbines operating in parallel and driving four axial compressor rotor stages. The parallel arrangement for the oxygen supply is possible if there is a high flow, but relatively low pressure of oxygen at the discharge of the heat exchanger 27. In spite of the lower speed of rotation, the greater number of rotor stages achieves the same compression ratio as the first embodiment without variation.

Figure 5:
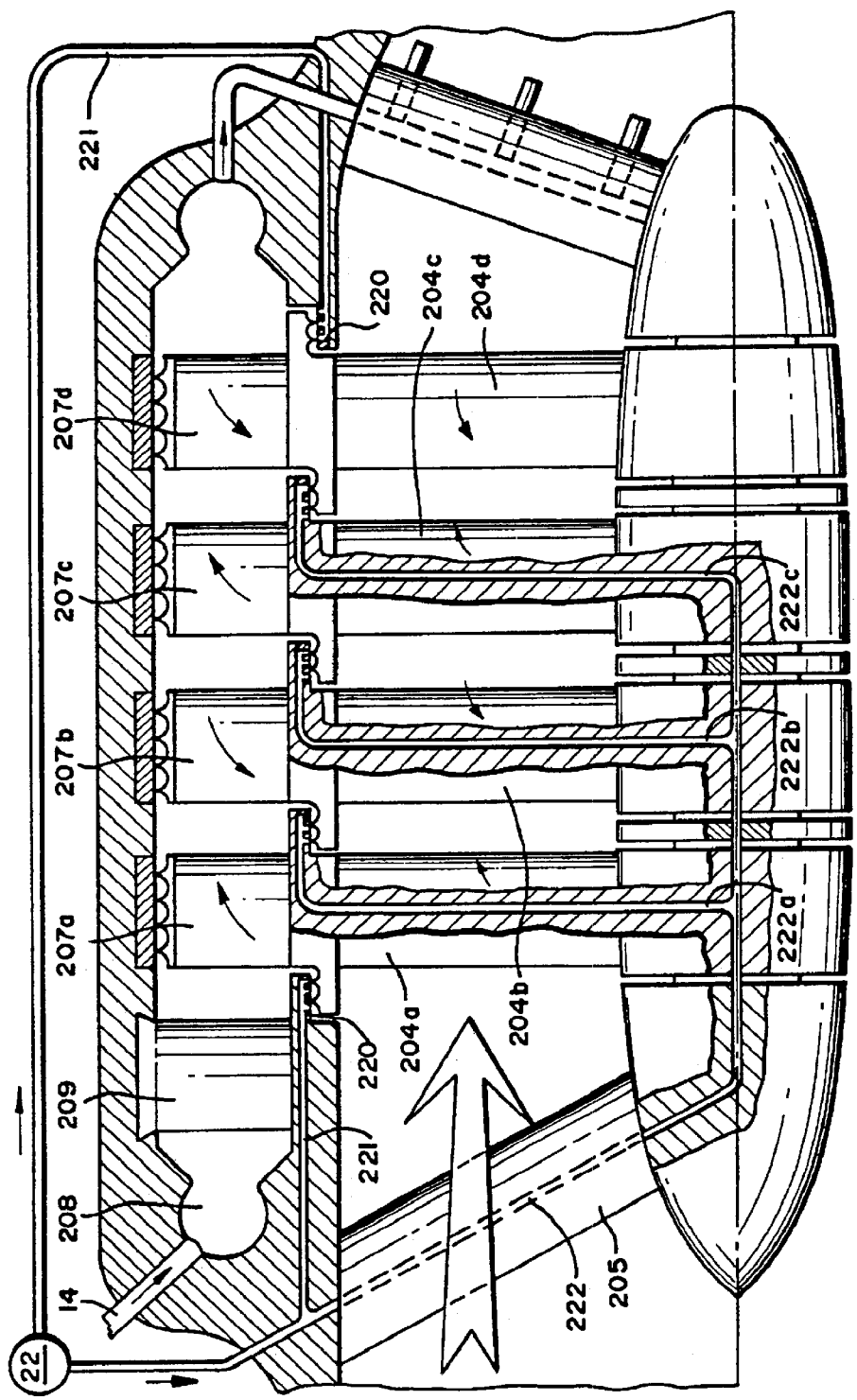
FIG. 5 is an enlarged, cross-sectional view of a second variation of the first embodiment of the invention illustrating counter-rotating compressor stages in a common annular chamber.

FIG. 5 illustrates a second variation of the first embodiment in FIG. 4 in which the two pairs of turbine blades on the counter-rotating compressor stages are located in the same annular chamber such that the driving turbines are supplied oxygen in series. In this variation of the first embodiment, the rotor stages 204a–204d are driven by the axial turbine blades 207a–207d, respectively and each of the turbine blades are located in annular chamber 208. Oxygen enters the chamber 208 via the supply tube 14 and, after passing over the stator vanes 209, passes over each of the turbine blades 207a–207d before exiting the annular chamber.

The series arrangement is applicable to those situations in which a low flow rate, but high pressure oxygen is present at the discharge of heat exchanger 27. The series arrangement achieves a higher specific impulse than does the corresponding parallel feed arrangement because of the low flow of oxygen, but requires a oxygen pump with a higher pressure ratio and higher performance sealing. Accordingly, a more complex inert gas sealing circuit may be called for in this embodiment which may comprise, in addition to the direct feeds 221 to labyrinth seals 220 of the first and last stages, a parallel feed of inert gas to the inter-rotor seals. This may be implemented by tube 222 passing through one of the stator vanes 205 and into the central compressor shaft and subsequently splitting off into individual conduits 222a, 222b and 222c passing through the respective compressor rotor blades. These conduits direct the inert gas onto the blade sealing members between the respective adjacent compressor stages.

Figure 6:
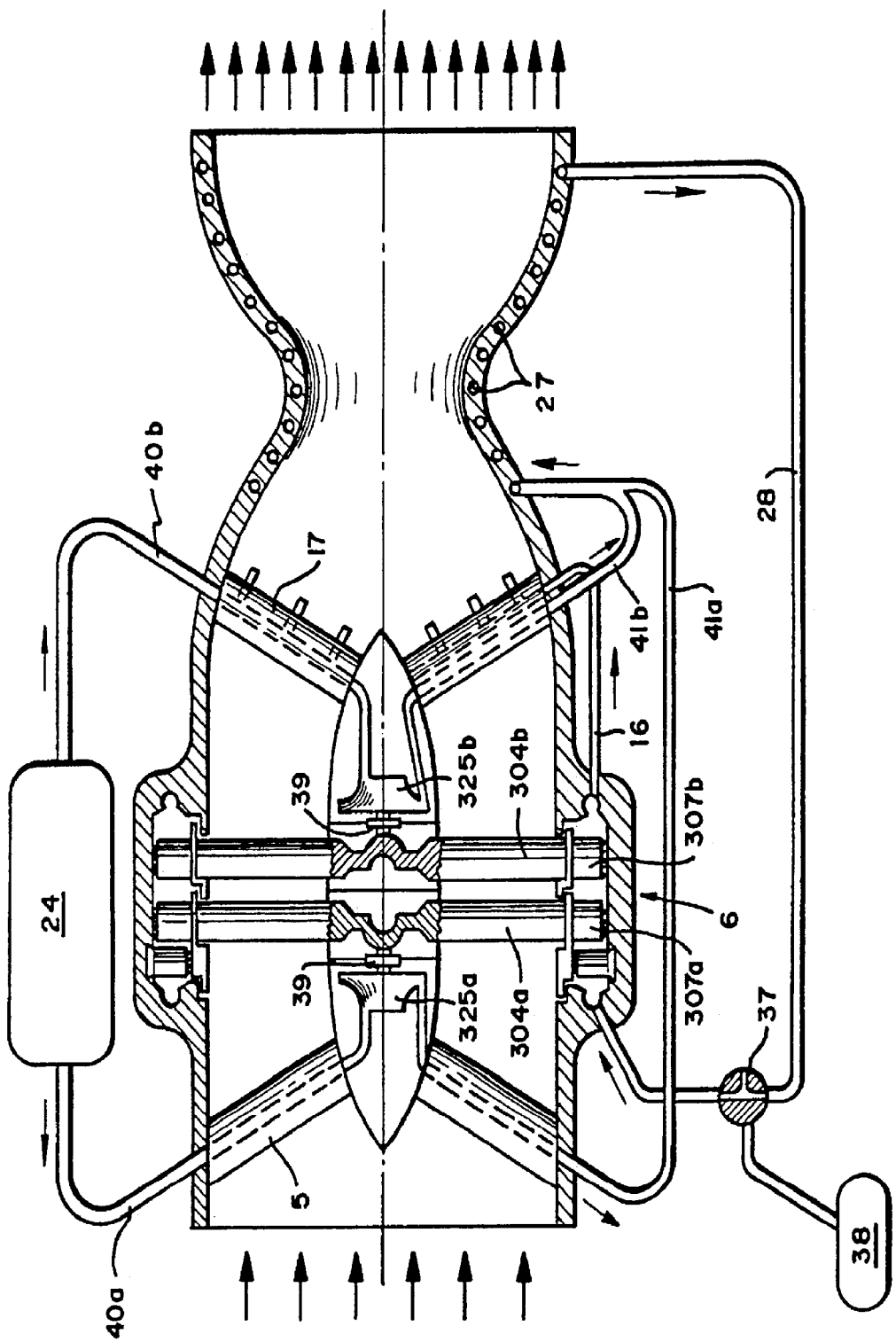
FIG. 6 is a longitudinal, cross-sectional view of a third variation of the first embodiment of the power plant according to the invention.

In the third variation of the first embodiment shown in FIG. 6, the axial compressor comprises a single pair of counter-rotating compressor rotor wheels and utilizes the rotation of each of the compressor rotors to drive internal oxygen pumps. In this instance, liquid oxygen pumps 325a and 325b are located in the hub which rotatably supports each of the rotors. Step-up gear units 39 can interconnect each of the liquid oxygen pumps with a rotor wheel to assure adequate rotational speed of the oxygen pumps.

In the third variation of the first embodiment conduits 40a and 40b feed the liquid oxygen from the reservoir 24 into the oxygen pumps 325a and 325b through the radial arms of the intake stator vane 5 and those supporting the oxygen injection tubes 17. At the pump outputs, oxygen circuits 41a and 41b merge upstream of the heat exchanger 27 to supply the oxygen to the heat exchanger. Thereafter, conduit 28 directs the gaseous oxygen to the intake of the drive turbine 6 such that the gas passes over the turbine blades 307a and 307b in series. The exhaust from the annular chamber is the same as that in the variations of the first embodiment and directs the expanded oxygen to the injection tubes 17.

Figure 7:
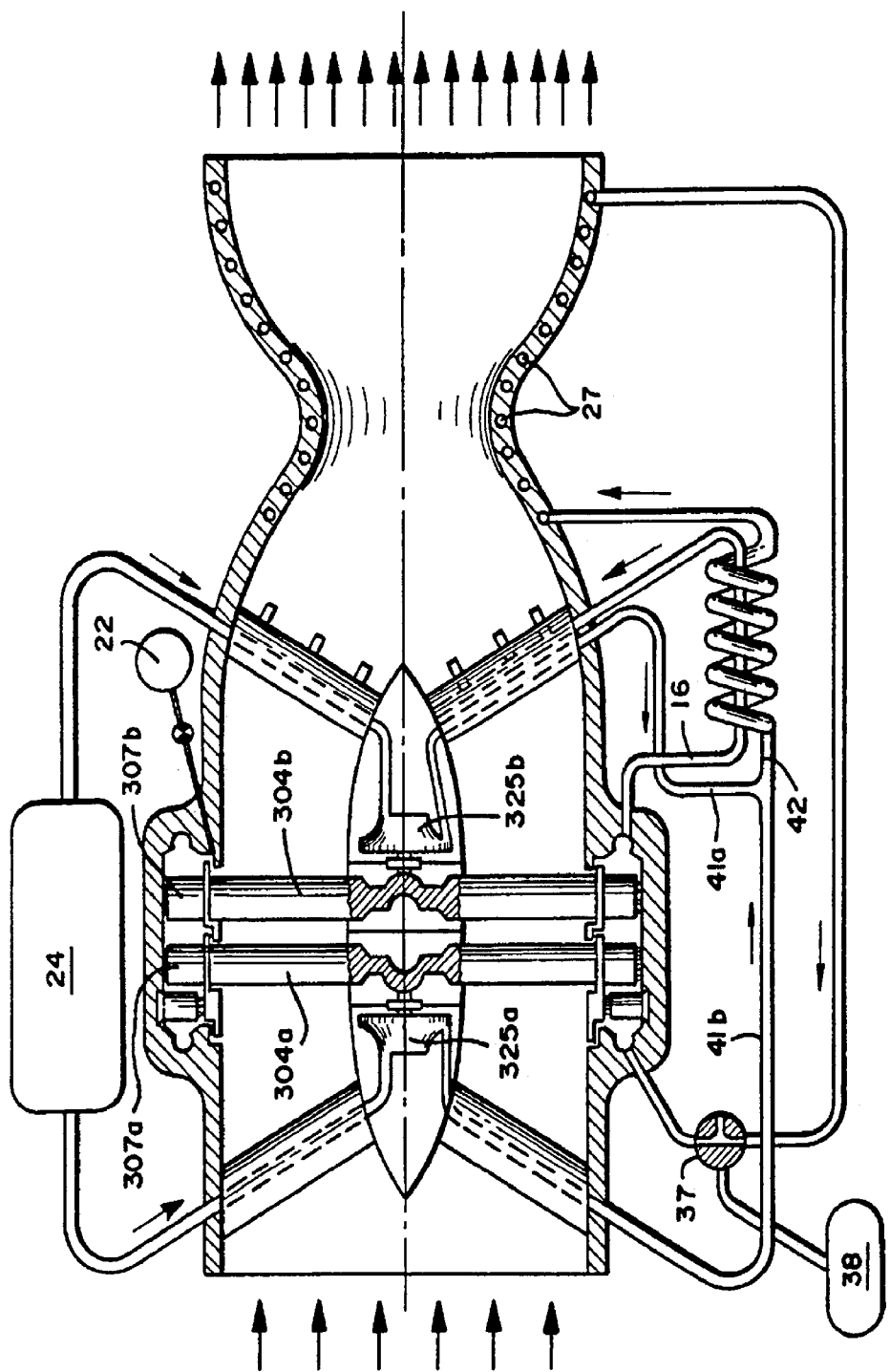
FIG. 7 is a longitudinal, cross-sectional view of a fourth variation of the first embodiment of the power plant shown in FIG. 6 incorporating a second heat exchanger.

In the fourth variation of the embodiment shown in FIG. 7, the oxygen supply circuit has been supplemented by a second heat exchanger. In this variation, the output tubes 41a and 41b of the oxygen pumps 325a and 325b merge into a single conduit 42 which is coiled around the tube 16 directing the oxygen from the drive turbine toward the injection tubes 17. Accordingly, the liquid oxygen leaving the pumps absorbs heat from the oxygen issuing from the drive turbine before passing into the second heat exchanger 27. This variation increases the available oxygen energy at the turbine intake and recovers higher power from the turbine. The power of the oxygen pumps can be increased, thereby increasing the pressure in the main chamber, thereby increasing the specific impulse of the power plant.

Figure 8:
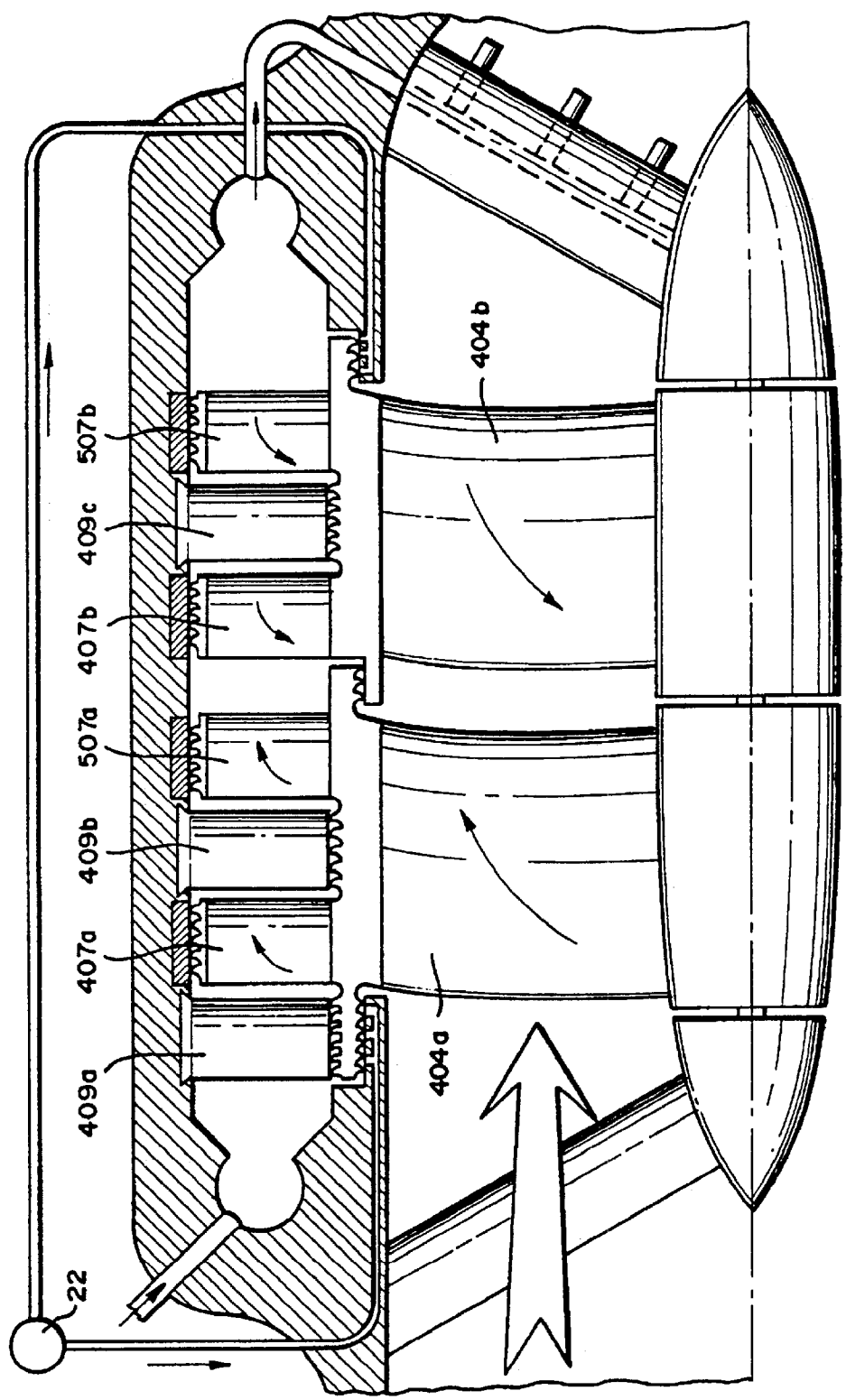
FIG. 8 is an enlarged, cross-sectional view illustrating a fifth variation of the first embodiment of the power plant according to the present invention.

Although the foregoing variations of the power plant according to the invention have been thus far described as incorporating a single axial turbine blade for each blade of the compressor rotor stage, more than one drive turbine blade can be utilized, as illustrated in FIG. 8. In this fifth variation of the first embodiment, two axial turbine blades are utilized for each of the compressor rotor blades. Turbine blades 407a and 507a are formed with compressor rotor blade 404a, while turbine blades 407b and 507b are formed integrally with compressor rotor blade 404b. Additional stator vanes 409b and 409c are also utilized in addition to the upstream stator vane 409a. As can be seen, vane 409b extends between turbine blades 407a and 507a, while stator vane 409c extends between turbine blades 407b and 507b. No stator vanes are necessary between adjacent turbine blades 507a and 407b due to their opposite rotational directions.

Figure 9:
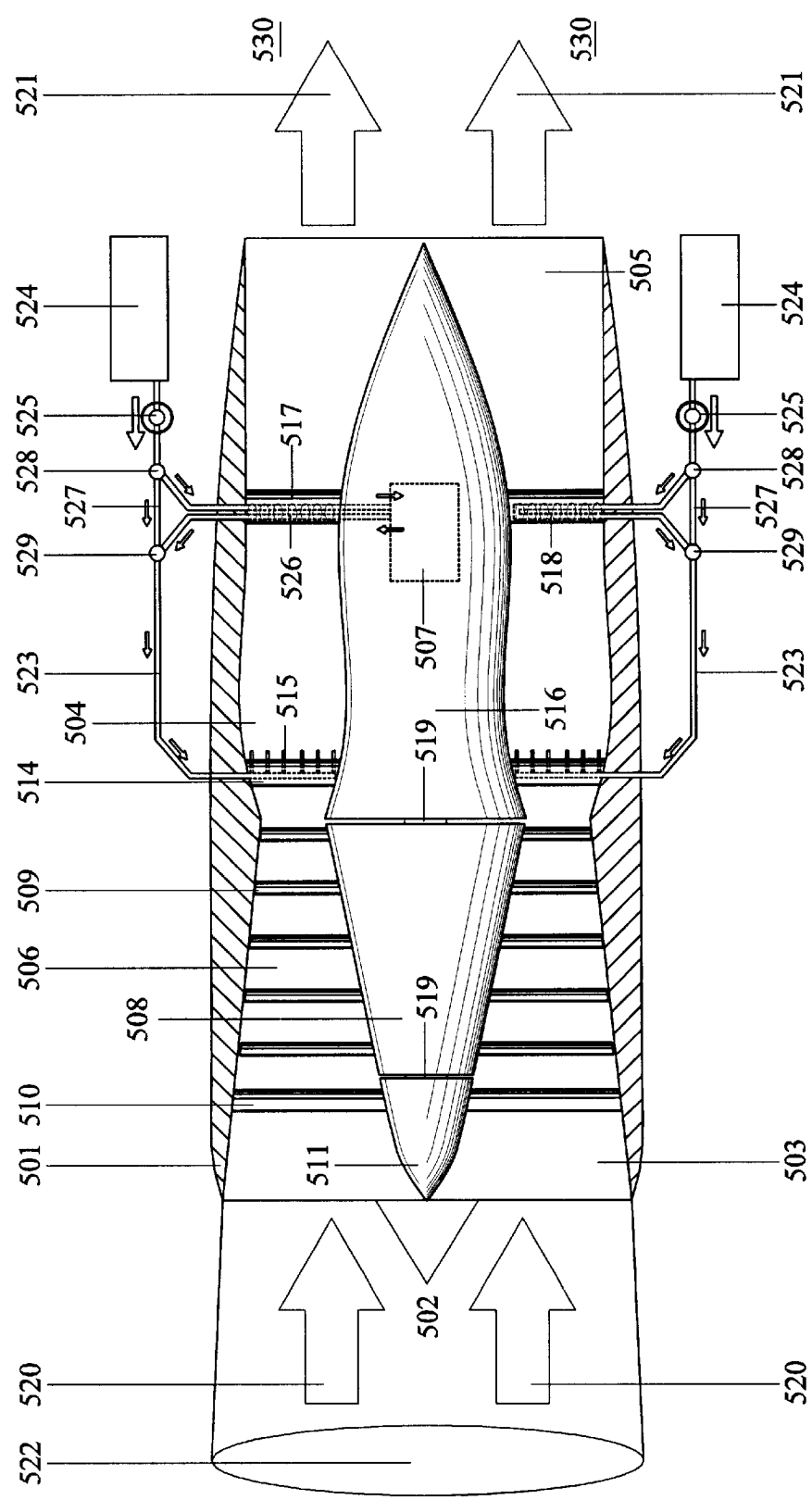
FIG. 9 is a longitudinal sectional view illustrating a second embodiment of the power plant according to the invention showing with alternative means for coaxial compressor driving.

The second embodiment of the power plant which is illustrated in FIG. 9 includes a duct casing 501 which defines a gas duct 502, which in turn defines a gas intake 503, a combustion chamber 504, and an exhaust nozzle 505, and surrounds an axial compressor stage 506, a combustion chamber stage, and an axial turbine or electric motor stage 507. The axial compressor stage 506 has at least one compressor rotor 508 having a plurality of compressor blades 509 extending radially therefrom. The compressor rotor 508 of the axial compressor 508 and 509 is located downstream of first stator guide vane 510 which supports a first hub 511 coaxially with the longitudinal axis of the gas duct 502 to rotatably support the compressor rotor 508. The axial compressor 508 and 509 is driven via a shaft 519 by the axial turbine stage or electric motor 507. The axial turbine 507 may be driven by vaporized liquid oxygen. A second stator guide vane 514 supports the oxidizer injectors 515 and in which the oxidizer injectors 515 are located. The second stator guide vane 514 supports a second hub 516 coaxially with the longitudinal axis of the gas duct 502 to also rotatably support the compressor rotor 508 with the first hub 511. A third stator guide vane 517, which may also supports the second hub 516 coaxially with the longitudinal axis of the gas duct 502, may alternatively house supply tubes 526 for carrying liquid oxygen for driving the axial turbine 507 (as shown in the upper supply tube circuit from the upper liquid oxygen reservoir 524, hereinafter referred to as the upper circuit), or for carrying liquid oxygen through the stator guide vane 517 solely for heating and vaporization (as shown in the lower supply tube circuit from the lower liquid oxygen reservoir 524, hereinafter referred to as the lower circuit).

In the second embodiment the operation of the rocket engine commences with the intaking 502 of gaseous fuel 520 drawn from one or more reservoirs, or from the upper atmosphere, by the axial compressor 508 and 509. With compression by the axial compressor 508 and 509 the gaseous fuel is sent to a combustion chamber 504 to be mixed with an injected 515 oxidizer for ignition and burning. The energetic products of the combustion of the gaseous fuel then exit from the exhaust nozzle 505 to the space outside the gas duct 530 to provide reaction thrust.

In the second embodiment shown in FIG. 9 the turbine 507 is coaxially located with respect to the gaseous-fuel compressor 508 and 509 and is connected to the compressor by a generally axially extending shaft 519. The oxygen expanding through the turbine 507 is subsequently injected into a gaseous-fuel duct 502 which surrounds the turbine 507 and the compressor 508 and 509 and defines a gaseous-fuel flow path. The compressed gaseous-fuel issuing from the compressor is burned upon being mixed with the oxygen just upstream of the combustion chamber 504, and the mixture of burned gases is exhausted downstream through a diverging exhaust nozzle 505. Such an embodiment also includes the driving of the gaseous-fuel compressor with an electric motor coaxially located with respect to the gaseous-fuel compressor, instead of an oxygen driven turbine.

Gaseous fuel is supplied to the turbine compressor 508 and 509 from a gas reservoir by at least one gaseous fuel pipe 522. The process of supplying gaseous fuel to the power plant may be assisted by electromagnetically accelerating the gaseous fuel to the intake, pumping, including ultrasonic pumping, pre-compression, and contraction of the gaseous fuel reservoir.

The circuit for supplying oxidizer to the supply tube 523 starts at an oxidizer reservoir 524 storing an oxidizer, such as liquid oxygen, having an outlet connected to pump 525 which may pump the oxidizer from the reservoir 524 into supply tube 523. An oxidizer, such as liquid oxygen, may be first pumped 525 through a heat exchanger 526 included in the third stator guide vane 517 in the exhaust nozzle 505 so as to absorb the heat of the exhaust gases passing through the exhaust nozzle 505 and cool the third stator guide vane 517 as well as gasify liquid oxygen. The temperature of liquid oxygen passing through the heat exchanger 526 would be raised and liquid oxygen vaporized so that gaseous oxygen would pass through a supply tube 523 connected to the outlet of the heat exchanger 526. Oxidizer, such as liquid oxygen, may also be made to pass through another heat exchanger consisting of tubes around and through the casing 501 of the exhaust nozzle 505 and the third hub 518 so as to absorb heat from the exhaust gases 521 and thereby initially raise its temperature and cool the exhaust nozzle 505 and the third hub 518. As previously stated, an oxidizer circuit such as the upper circuit would be used when an axial turbine 507 was used to drive a turbine compressor, and an oxidizer circuit such as the lower circuit would be used only to have the oxidizer absorb heat in the case when a turbine compressor is driven by an electric motor 507.

Under certain operating conditions, or for certain oxidizers useable without vaporization prior to injection into the combustion chamber, the heat exchanger 526 may be bypassed by allowing the oxidizer to flow through bypass tube 527 and subsequently into supply tube 523 by the use of the three-way, three-port valves 528 and 529.

A third embodiment of the invention, not shown in the drawings, includes a turbine compressor, driven electrically or by an expanding oxidizer driven turbine, which is a separate component connected by a pipe or duct to a component which comprises the gaseous-fuel duct in which mixing of the gaseous-fuel and oxidizer takes place, the combustion chamber in which the gaseous-fuel and oxygen mixture is burned, and the exhaust nozzle from which the burned gases exit to provide thrust.

While the invention has been disclosed in some of its embodiments, it will be understood that there is no intention to limit the invention to any of the particular embodiments shown, but it is intended to cover the various alternative and equivalent constructions included within the spirit and scope of the appended claims which are demonstrated by the embodiments and their variations.

What I claim as my invention is:

1. A gaseous-fuel breathing rocket engine comprising:
   (a) a gaseous-fuel duct defining a gaseous-fuel intake;
   (b) an axial gaseous-fuel compressor having at least one or more compressor rotor stages, each having a rotor stage wheel with a plurality of compressor blades, disposed within the gaseous-fuel duct for compressing gaseous fuel;
   (c) one or more nozzles operatively associated with the gaseous-fuel duct to exhaust gases therefrom;
   (d) at least one annular chamber extending around the gaseous-fuel duct in the plane of said one or more rotor stages;
   (e) a turbine disposed in the at least one annular chamber comprising:
      (i) at least one turbine stator vane stage; and,
      (ii) at least one turbine rotor blade stage with at least one turbine blade operatively associated with each of the compressor blades of each of the compressor stages such that rotation of the turbine rotor stages causes rotation of the at least one pair of compressor rotor stages;
   (f) a source of liquid oxygen;
   (g) at least one pump for transporting the liquid oxygen from the source into the annular chamber so as to rotate the turbine rotor stage;
   (h) an oxygen exhaust from the annular chamber into the gaseous-fuel duct; and,
   (i) one or more injectors for directing the oxygen from the annular chamber for mixing with the compressed gaseous fuel.

2. The rocket engine according to claim 1 further comprising a heat exchanger interposed between the oxygen source and the annular chamber to raise the temperature of the oxygen before entering the annular chamber.

3. The rocket engine according to claim 2 wherein the heat exchanger comprises a heat exchange coil disposed around at least one nozzle to absorb heat therefrom.

4. The rocket engine according to claim 2 wherein the heat exchanger comprises:
   (a) a first heat exchanger; and,
   (b) a second heat exchanger disposed between the first heat exchanger and the annular chamber to further raise the temperature of the oxygen before entering the annular chamber.

5. The rocket engine according to claim 1 further comprising a seal between the compressor blades and the annular chamber to prevent oxygen from entering the gaseous-fuel duct at this location.

6. The rocket engine according to claim 5 wherein the seal comprises:
   (a) a labyrinth seal platform extending axially from the compressor blade; and
   (b) an abradable sealing ring on the gaseous-fuel duct contacting the labyrinth seal platform.

7. The rocket engine according to claim 6 further comprising;
   (a) a source of inert gas; and,
   (b) means connected to the inert gas source to direct the gas between the labyrinth seal platform and the abradable sealing ring.

8. The rocket engine according to claim 1 further comprising an auxiliary turbine drivingly connected to the pump.

9. The rocket engine according to claim 1 further comprising a hub located approximately coincident with a longitudinal axis of the gaseous-fuel duct to rotatably support the compressor rotor stage wheel.

10. The rocket engine according to claim 9 wherein the at least one pump is located in the hub and is rotatably connected to the compressor rotor stage wheel so that rotation of the compressor rotor wheel drives the at least one pump.

11. The rocket engine according to claim 1 further comprising a separate annular chamber for each adjacent two of said one or more compressor rotor stages.

12. The rocket engine according to claim 11 further comprising a conduit connecting said at least one annular chamber to the pump.

13. The rocket engine according to claim 1 wherein the turbine blades associated with one or more adjacent two of said one or more compressor rotor stages are oriented so that said one or more adjacent two of said one or more compressor rotor stages rotate in opposite directions.

14. The rocket engine according to claim 1 wherein the turbine further comprises:
   (a) at least two turbine blades operatively associated with each compressor rotor blade; and,
   (b) at least two turbine stator stages.

* * * * *